(12) United States Patent
Hartley et al.

(10) Patent No.: US 12,530,048 B2
(45) Date of Patent: Jan. 20, 2026

(54) METHODS AND APPARATUS FOR CONTROLLING CLOCK CIRCUITRY

(71) Applicant: Arm Limited, Cambridge (GB)

(72) Inventors: Simon Alastair Hartley, Hornchurch (GB); David Michael Gilday, Northstowe (GB)

(73) Assignee: Arm Limited, Cambridge (GB)

( * ) Notice: Subject to any disclaimer, the term of this patent is extended or adjusted under 35 U.S.C. 154(b) by 385 days.

(21) Appl. No.: 17/727,997

(22) Filed: Apr. 25, 2022

(65) Prior Publication Data
US 2023/0341890 A1    Oct. 26, 2023

(51) Int. Cl.
| | |
|---|---|
| *G06F 1/12* | (2006.01) |
| *G06F 1/06* | (2006.01) |
| *G06F 1/32* | (2019.01) |
| *G06F 1/3234* | (2019.01) |

(52) U.S. Cl.
CPC .................. *G06F 1/12* (2013.01); *G06F 1/06* (2013.01); *G06F 1/3234* (2013.01)

(58) Field of Classification Search
None
See application file for complete search history.

(56) References Cited

U.S. PATENT DOCUMENTS

| | | | | |
|---|---|---|---|---|
| 6,016,551 | A  * | 1/2000 | Stoler | G06F 1/3203 |
| | | | | 711/146 |
| 6,247,134 | B1 * | 6/2001 | Sproch | G06F 9/3832 |
| | | | | 712/E9.046 |
| 7,278,040 | B2 * | 10/2007 | Gaskins | G06F 1/3237 |
| | | | | 327/113 |
| 2006/0047988 | A1 * | 3/2006 | Okada | G06F 1/3237 |
| | | | | 713/323 |
| 2021/0026641 | A1 * | 1/2021 | Caulfield | G06F 9/30047 |
| 2022/0199171 | A1 * | 6/2022 | Suzuki | G06F 3/0658 |
| 2023/0315141 | A1 * | 10/2023 | Jain | G01R 31/31727 |
| | | | | 327/291 |

* cited by examiner

*Primary Examiner* — Fahmida Rahman
(74) *Attorney, Agent, or Firm* — NIXON & VANDERHYE P.C.

(57) ABSTRACT

Aspects of the present disclosure relate to an apparatus comprising processing circuitry to process inputs, the processing circuitry comprising a plurality of sequential stages; clocked input circuitry to receive a flow of clocked inputs and provide clocked inputs to the processing circuitry, clocked inputs being synchronised with one or more clock signal of the processing circuitry; and asynchronous input circuitry to receive an asynchronous input and provide asynchronous input to the processing circuitry. The asynchronous input is a deactivation signal to direct the processing circuitry to cease processing clocked inputs. Clock circuitry provides one or more clock signals, said clock circuitry being responsive to deactivation signal to control a deactivation of the one or more clock signals such that each of plurality of sequential stages undergoes a respective corresponding number of clock cycles.

14 Claims, 7 Drawing Sheets

METHODS AND APPARATUS FOR CONTROLLING CLOCK CIRCUITRY

BACKGROUND

The present technique relates to the field of processing apparatuses comprising clock circuitry. In such processing apparatuses, clock circuitry may be used to mediate the functioning of clocked circuitry, e.g. by transmitting regular clock signals to the clocked circuitry. For example, clocked circuitry could proceed by one or more functional steps for each "tick" of the received clock signal.

In some such apparatuses, multiple clock signals are used to control multiple stages of a processing apparatus. In such apparatuses, problems can arise if the synchronisation between such multiple stages is damaged or lost. In particular, even if synchronisation is well-maintained during normal operation, it can be damaged or lost in particular operating conditions.

There is thus a desire for improved reliability of such synchronisation.

SUMMARY

At least some examples provide an apparatus comprising:
processing circuitry to process inputs, the processing circuitry comprising a plurality of sequential stages;
clocked input circuitry to receive a flow of clocked inputs and provide said clocked inputs to the processing circuitry, said clocked inputs being synchronised with one or more clock signal of the processing circuitry; and
asynchronous input circuitry to receive an asynchronous input and provide said asynchronous input to the processing circuitry, said asynchronous input being a deactivation signal to direct the processing circuitry to cease processing clocked inputs;
clock circuitry to provide said one or more clock signals, said clock circuitry being responsive to said deactivation signal to control a deactivation of the one or more clock signals such that each of said plurality of sequential stages undergoes a respective corresponding number of clock cycles.

Further examples provide a method comprising:
receiving a flow of clocked inputs and provide said clocked inputs to processing circuitry comprising a plurality of sequential stages, each stage having an associated clock signal, said clocked inputs being synchronised with one or more of said clock signals; and
receiving an asynchronous input and providing said asynchronous input to the processing circuitry, said asynchronous input being a deactivation signal to direct the processing circuitry to cease processing clocked inputs;
responsive to said deactivation signal, controlling a deactivation of said one or more clock signals such that each of said plurality of sequential stages undergoes a respective corresponding number of clock cycles.

Further examples provide a non-transitory computer-readable medium to store computer-readable code for fabrication of the above-described apparatus.

Further aspects, features and advantages of the present technique will be apparent from the following description of examples, which is to be read in conjunction with the accompanying drawings.

DESCRIPTION OF EXAMPLES

Figure 1:
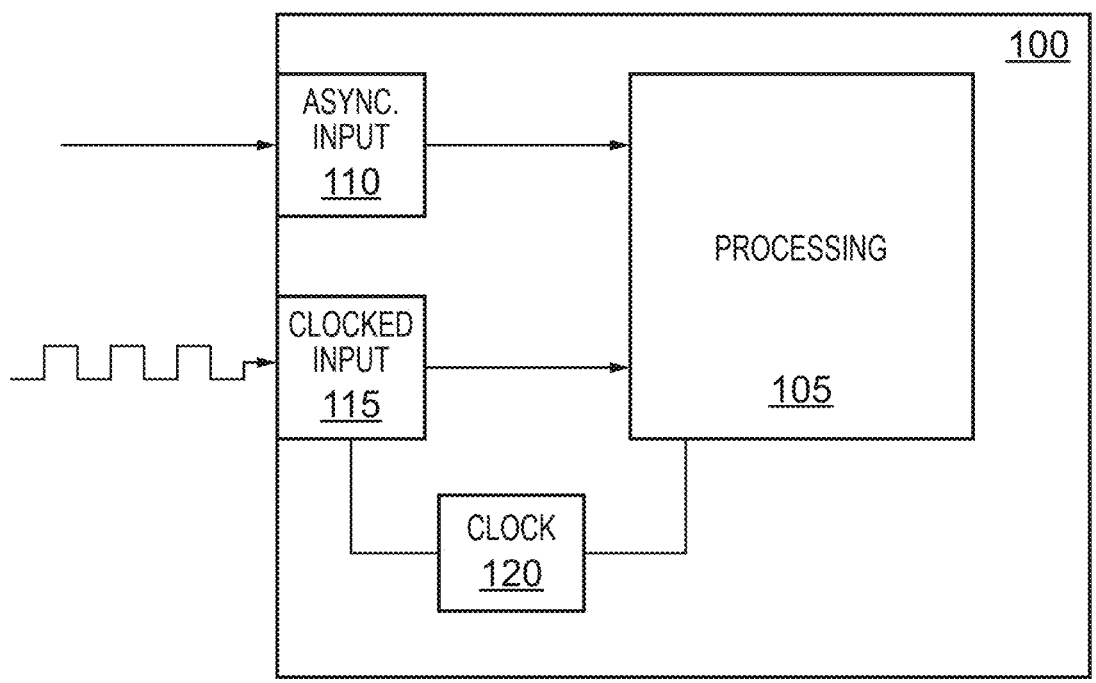
FIG. 1 schematically depicts an apparatus according to an example.

In an example, an apparatus comprises processing circuitry to process inputs. The processing circuitry comprises a plurality of sequential stages. For example, the processing circuitry may be a processor such as a central processing unit, and the stages may be pipelined processing stages therein. An input may thus proceed through the stages sequentially and thereby be processed by the processing circuitry.

The apparatus comprises clocked input circuitry to receive a flow of clocked inputs and provide said clocked inputs to the processing circuitry. The clocked inputs are synchronised with one or more clock signal of the processing circuitry. The clocked inputs may be received from other components of the apparatus, or other apparatuses, such as peripherals or other processing components. In an example, the clocked inputs correspond to processing instructions which are to be processed as they pass through the sequential stages.

The apparatus comprises asynchronous input circuitry to receive an asynchronous input, which is not synchronised with the one or more clock signals. In this example, the asynchronous input is a deactivation signal which directs the processing circuitry to cease processing clocked inputs. For example, it may be a sleep signal received from another component of the apparatus, to direct the processing circuitry to temporarily be deactivated (for example to save power). Alternatively or additionally, the deactivation signal may be a power-down signal or a reset signal. The asynchronous input circuitry provides this asynchronous input to the processing circuitry.

The apparatus comprises clock circuitry to provide the aforementioned one or more clock signals. The clock circuitry is responsive to the deactivation signal to control the deactivation of the one or more clock signals. The clock circuitry may effectively detect this signal by monitoring the asynchronous input circuitry.

The deactivation is controlled such that each of said plurality of sequential stages undergoes a respective corresponding number of clock cycles. For example, this may be performed such that each of the plurality of sequential stages is deactivated at the same relative point in the flow of clocked signals. This means that, effectively, the stages are still synchronised after they have been deactivated. This contrasts with comparative examples in which a deactivation of multiple sequential stages is not controlled in this manner: in such comparative examples, an asynchronous deactivation signal can lead to the stages falling out of synchronisation with each other. This is particularly problematic when it leads to a processing operation becoming "stuck" part-way through the sequence of stages, for example because the next stage is deactivated while the current stage is still active. This can lead to failure of the execution of the instruction.

As another example, if the clock signals and processing circuitry are reactivated at a later time, in the present example the reactivation can be performed in a controlled way such that synchronisation is maintained. In comparative examples, in contrast, once synchronisation is lost it can be difficult or impossible to regain without e.g. re-sending processing instructions which were being processed when the deactivation occurred. The present example thus reduces the quantity of failed processing, and thereby improves overall operation efficiency.

In an example, the clock circuitry is configured to control the deactivation of the one or more clock signals such that a clocked input received prior to the deactivation signal continues to proceed through the plurality of sequential stages, whereas a clocked input received subsequent to the deactivation signal is blocked from proceeding through the plurality of sequential stages. In effect, this means that any inputs received prior to the deactivation signal will continue to be processed, whereas no subsequent inputs are permitted to begin processing. Thus, once deactivation is complete, no instructions will be "stuck" part-way through the sequence of stages and need to be re-sent. Reactivation can later be effectively performed to ensure that the stages remain synchronised.

In an example, the clock circuitry comprises a plurality of clock units, each clock unit being configured to generate a corresponding one of said one or more clock signals. Each of these clock signals is associated with one or more of the plurality of sequential stages, such that the operations performed by a given stage are mediated by its corresponding clock signal. In this example, the clock circuitry may be configured to control the deactivation by sequentially deactivating each of the plurality of clock units, for example first deactivating the clock unit associated with the first stage, then the clock unit associated with the second stage, and so on. This provides an effective way of ensuring that each of the sequential stages undergoes a respective corresponding number of clock cycles. For example, where a clocked input proceeds through one stage per clock cycle, one clock unit may be deactivated per clock cycle, such that each unit is deactivated at the same relative point in the flow of clocked signals.

In an example, the asynchronous input circuitry is responsive to the deactivation signal to temporarily block subsequent inputs that would change a power state of the processing circuitry. For example, once the deactivation process has started, further power-state-changing inputs (e.g. deactivation or reactivation signals) may be blocked whilst the clock circuitry is performing the deactivation of the clock signals. The block may then be lifted when the deactivation process has completed. This ensures that synchronisation between the sequential stages is maintained. This may be performed by masking said subsequent inputs such that they are not received and processed by the clock circuitry.

In one such example, the blocking is achieved by having the clock circuitry issue a deactivation confirmation following completion of the deactivation of the one or more clock signals. The asynchronous input circuitry is accordingly configured to cease said blocking, responsive to the clock deactivation confirmation This provides an effective way to perform the above-described temporary blocking.

The above description has discussed deactivation. The apparatus may be configured to perform a corresponding reactivation process at a later time. Such a process will now be described.

The asynchronous input circuitry may be configured to, subsequent to said deactivation of the one or more clock signals, receive a second asynchronous input. The second asynchronous input is a reactivation signal to direct the processing circuitry to resume processing of clocked inputs. For example, this may be a wake signal, a power-on signal, and/or an activation signal.

The clock circuitry is responsive to the reactivation signal to control a reactivation of the one or more clock signals such that each of said plurality of sequential stages undergoes a respective corresponding second number of clock cycles. Thus the reactivation is, in effect, the reverse of the deactivation. For example, the reactivation may comprise sequentially reactivating the one or more clock signals in an order in which the clock signals were previously deactivated. This may be performed such that each of said plurality of sequential stages is reactivated at the same relative point in the flow of clocked signals. This effectively means that, overall, the stages are deactivated at a given point in the flow of clocked signals, and then reactivated at that point. Thus, from the perspective of the flow of clocked signals, there is no sign that the deactivation has taken place: synchronisation is maintained, and the deactivation and subsequent reactivation does not change the expected functioning of the system. Reliability is thereby improved, and the risk of undesired effects arising from loss of synchronisation is reduced or eliminated.

Examples of the present disclosure will now be described with reference to the drawings.

FIG. 1 schematically shows an apparatus according to an example. The apparatus 100 comprises processing circuitry 105 which receives inputs from asynchronous input 110 and clocked input 115. Clocked inputs are synchronised with a clock 120, which provides a regular signal which mediates the functioning of the processor 105. Asynchronous inputs, in contrast, can be received at any time and are not synchronised with the clock 120. Examples of asynchronous signals could include power-state-changing signals such as sleep signals.

Figure 2:
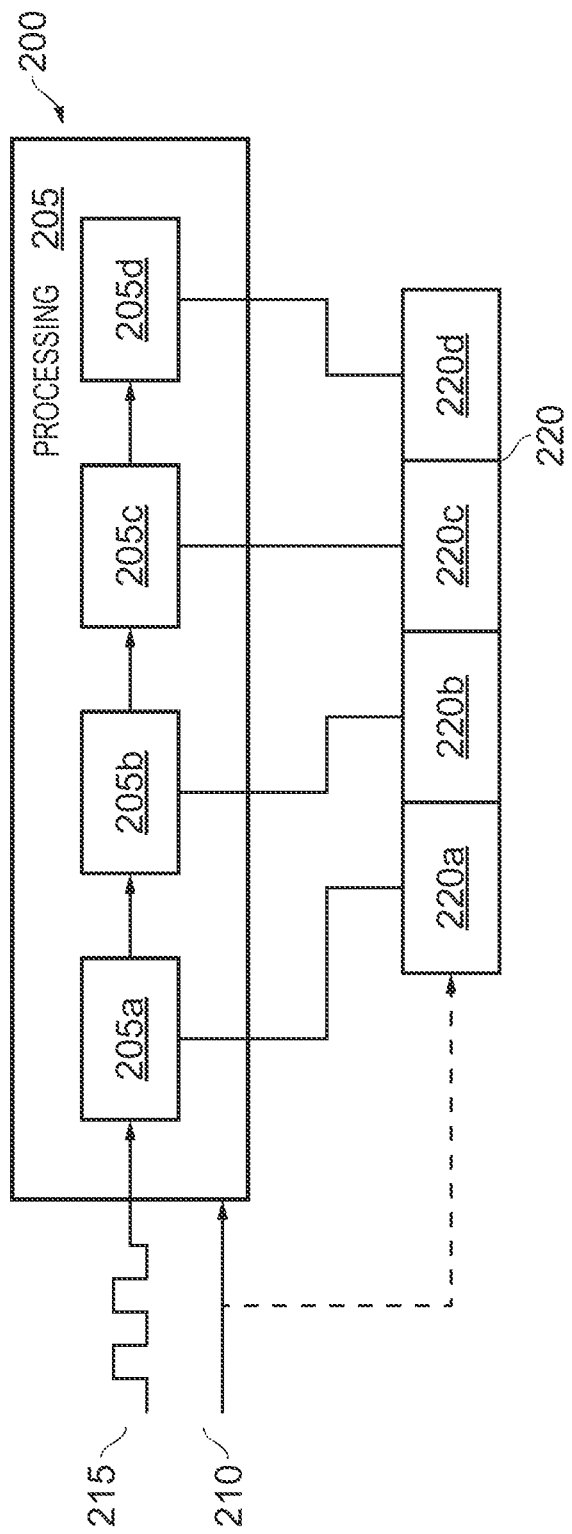
FIG. 2 depicts an apparatus according to an example.

FIG. 2 shows an apparatus 200, which may be considered a more detailed example of the apparatus 100 of FIG. 1.

The apparatus 200, similarly to that of FIG. 1, comprises processing circuitry 205. The processing circuitry 205 comprises a series of sequential stages 205a-205d. Clocked inputs 215 are received by the processing circuitry 205, and progress through the series of sequential stages. Specifically, in this example, a given clocked input 215 advances to the next stage with each "tick" of a clock signal.

The apparatus 200 further comprises clock circuitry 220, which comprises one clock unit 220a-220d for each processor stage 205a-205d. Each clock unit 220a-220d provides a clock signal to its respective processor stage 205a-205d. These clock signals are synchronised with each other, such that a given clocked input 215 can progress to the next stage 205a-205d with each "tick".

The apparatus is further configured to receive asynchronous inputs 210 which, as noted above, may be power-state-changing inputs such as sleep signals. The asynchronous inputs 210 are further detected by the clock circuitry 220.

Figure 3A:
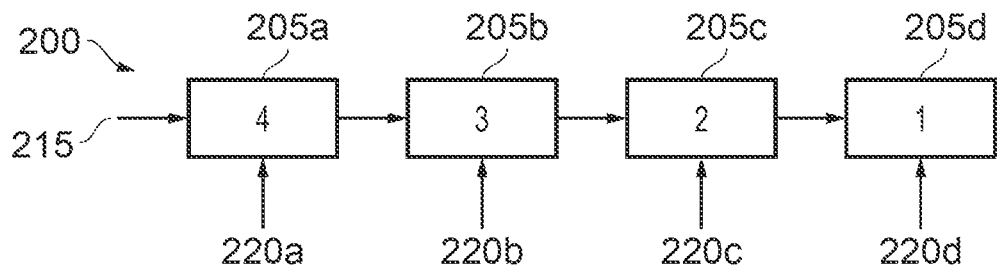
FIGS. 3A-3E illustrate a method for deactivating the apparatus of FIG. 2.
Figure 3B:
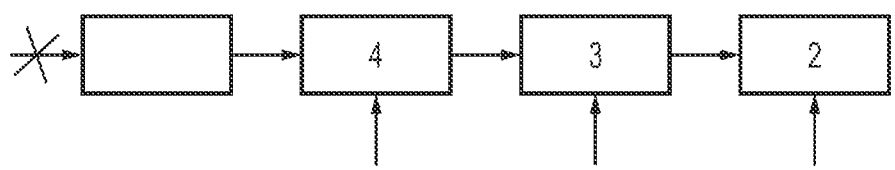

FIGS. 3A-3E depict the deactivation of the apparatus 200 in response to an asynchronous sleep signal. The figures show the status of the apparatus 200 across five consecutive clock cycles, such that FIG. 3A shows the status in a first clock cycle, FIG. 3B shows the status in a second clock cycle, and so on.

FIG. 3A shows a state of the apparatus 200 when the sleep signal is received. The processing circuitry 205 has received clocked inputs 1, 2, 3 and 4 in consecutive clock cycles. Thus, input 4 has progressed to processing unit 205d, input 3 to unit 205c, input 3 to unit 205b, and input 4 to unit 205a.

As described above, each processing unit 205a-205d receives a corresponding clock signal from a respective clock unit 220a-220d.

For brevity, the reference numerals have been omitted from FIGS. 3B to 3E. However, it can be seen that these figures show progressive states of the same apparatus 200.

FIG. 3B shows the status in a second clock cycle. Further clocked inputs 215 have been blocked, and the clock signal 220a to processing unit 205a has been deactivated. The clocked inputs which were already undergoing processing have continued their progress through the processing circuitry 200. Thus, processing of input 1 has completed, and inputs 2, 3 and 4 have each progressed to the next processing unit 205b-205d.

Figure 3C:
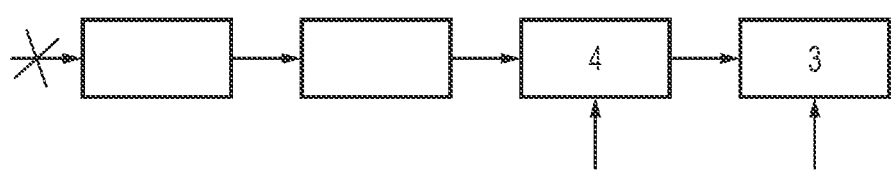

FIG. 3C shows the status in a third clock cycle, in which the clock signal 220b to processing unit 205b has been deactivated. Processing of input 2 has completed, and inputs 3 and 4 have each progressed to the next processing units 205c-205d.

Figure 3D:
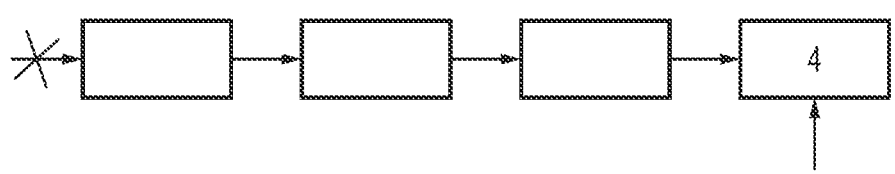

FIG. 3D shows the status in a fourth clock cycle, in which the clock signal 220c to processing unit 205c has been deactivated. Processing of input 3 has completed, and input 4 has progressed to the final processing unit 205d.

Figure 3E:

Finally, FIG. 3E shows the status in a fifth clock cycle, in which the clock signal 220d to processing unit 205d has been deactivated. Processing of inputs 1 to 4 has completed, and the apparatus 200 has completed its transition to a sleep state (all clock signals having been deactivated).

Thus, FIGS. 3A-3E show the sequential and controlled deactivation of the clock units 220a-220d. This, in particular in combination with the blocking of new inputs 215, means that processing of previous inputs can be completed (such that the processing thereof does not fail), whilst still allowing the deactivation of the apparatus 200. In effect, each processing unit 205a-205d is deactivated at the same relative point in the flow of inputs.

FIGS. 4A-4E depict the reactivation of the apparatus 200 at a time subsequent to the deactivation of FIGS. 3A-3E. For example, this may be in response to an asynchronous wake signal. Similarly to FIGS. 3A-3E, these show the apparatus state in consecutive clock periods.

Figure 4A:
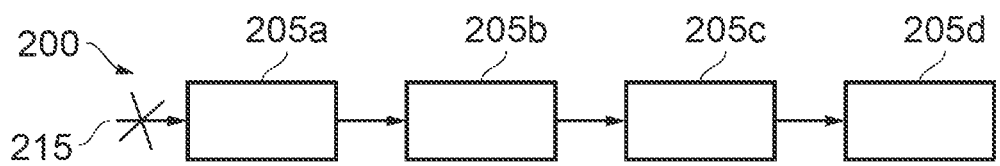
FIGS. 4A-4E illustrate a method for reactivating the apparatus of FIG. 2.

FIG. 4A shows the apparatus 200 in the same state as FIG. 3E: fully deactivated, with incoming clocked inputs 215 blocked. The asynchronous wake signal is then received.

Figure 4B:
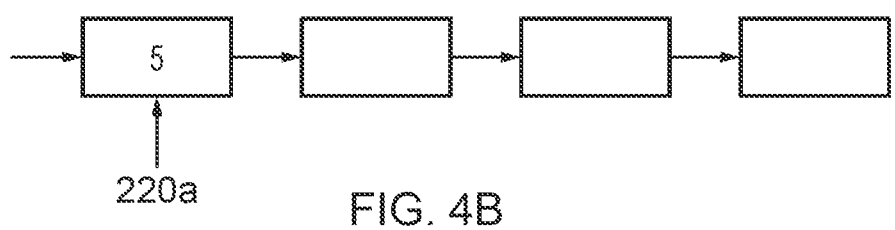

FIG. 4B shows the apparatus 200 in a next clock cycle. Clocked inputs 215 are again permitted, and clock signal 220a has been reactivated. Thus, a next clocked signal 5 can be received and handled by processing unit 205a.

Figure 4C:
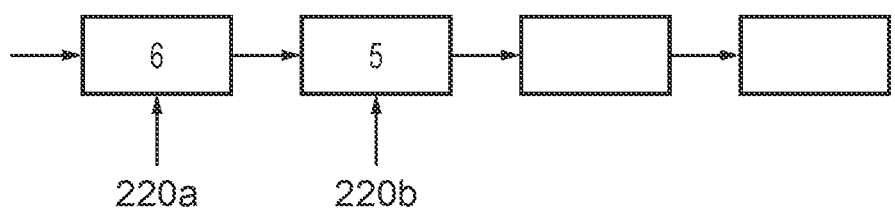

FIG. 4C shows the apparatus 200 in a next clock cycle. Clock signal 220b has been reactivated, and input 5 has moved to processing unit 205b. Clocked signal 6 has been received and is being handled by processing unit 205a.

Figure 4D:
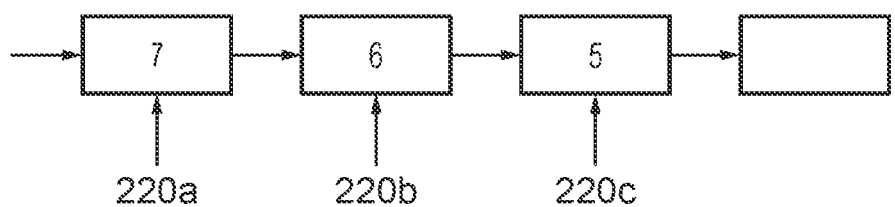

FIG. 4D shows the apparatus 200 in a next clock cycle. Clock signal 220c has been reactivated, and inputs 5 and 6 have moved to respective next processing units 205c and 205b. Clocked signal 7 has been received and is being handled by processing unit 205a.

Figure 4E:
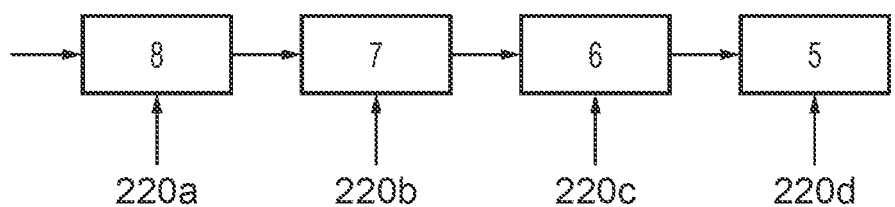

Finally, FIG. 4E shows the apparatus 200 in a next clock cycle. Clock signal 220d has been reactivated, and inputs 5, 6 and 7 have moved to respective next processing units 205d, 205c and 205b. Clocked signal 8 has been received and is being handled by processing unit 205a.

Thus, in FIG. 4E, all clock signals 220a-220d have been reactivated, and thus all processing units 205a-205d are operational. Further clocked inputs are permitted, and operation of the apparatus 200 can continue.

The sequential activation of the clock signals 220a-220d, as shown in FIGS. 4A-4E, allows the apparatus 200 to be reactivated with each processing unit 205a-205d resuming operation at the point in the flow of inputs at which was deactivated. In this way, the deactivation and subsequent reactivation of the apparatus is "transparent": to an external observer, inputs 1 to 8 are handled correctly in turn, without any inputs being "stuck" or otherwise lost in the processing apparatus 200.

Figure 5:
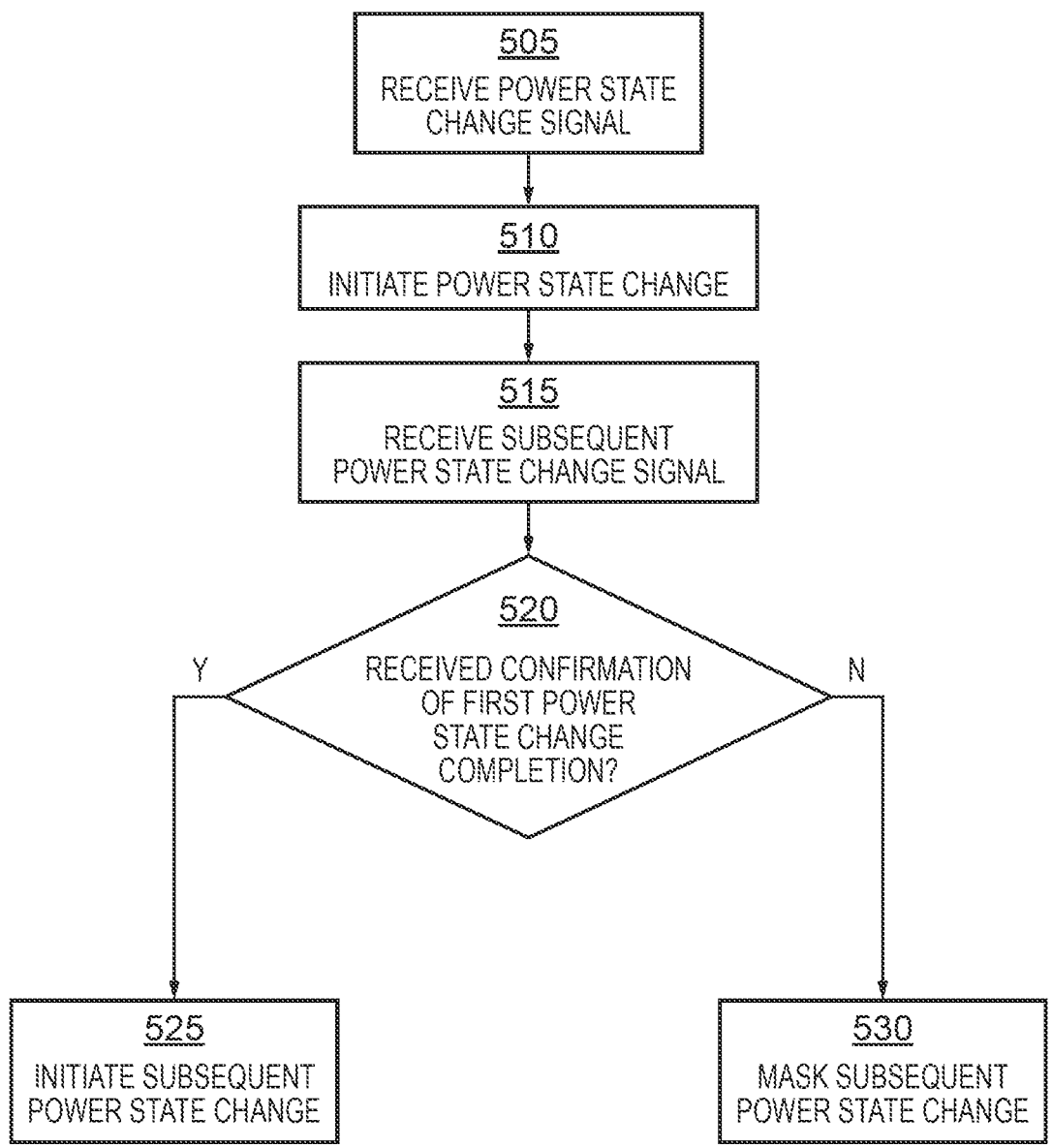
FIG. 5 depicts a method according to an example.

FIG. 5 depicts an example method, which may be performed by the processing circuitry 205 of the apparatus 200, for handling further asynchronous inputs which arrive whilst the processes of FIG. 3A-3E or 4A-4E are being performed.

A power state change signal (e.g. the aforementioned sleep/wake signals) is received at 505.

At 510, a power state change process is initiated. For example, this may be the process of FIGS. 3A-3E or the process of FIG. 4A-4E.

At 515, a subsequent power state change signal is received.

In the present example, once a power state change process has been completed (e.g. all clock signals 220a-220d are activated or deactivated, as appropriate), a confirmation is transmitted from the clock circuitry 220 to the processing circuitry 205. At 520, it is determined whether such a confirmation has been received in respect of the initial power state change signal. If so, flow proceeds to block 525, where the subsequent power state change process is initiated. Conversely, if the confirmation has not been received (and thus the initial power state change process is still ongoing), flow proceeds to 530 where the subsequent power state change signal is masked such that the signal is effectively blocked.

The method of FIG. 5 thus provides an effective way for ensuring that asynchronous inputs do not conflict with those which were received earlier, and thus maintaining correct operation of the apparatus 200.

Figure 6:
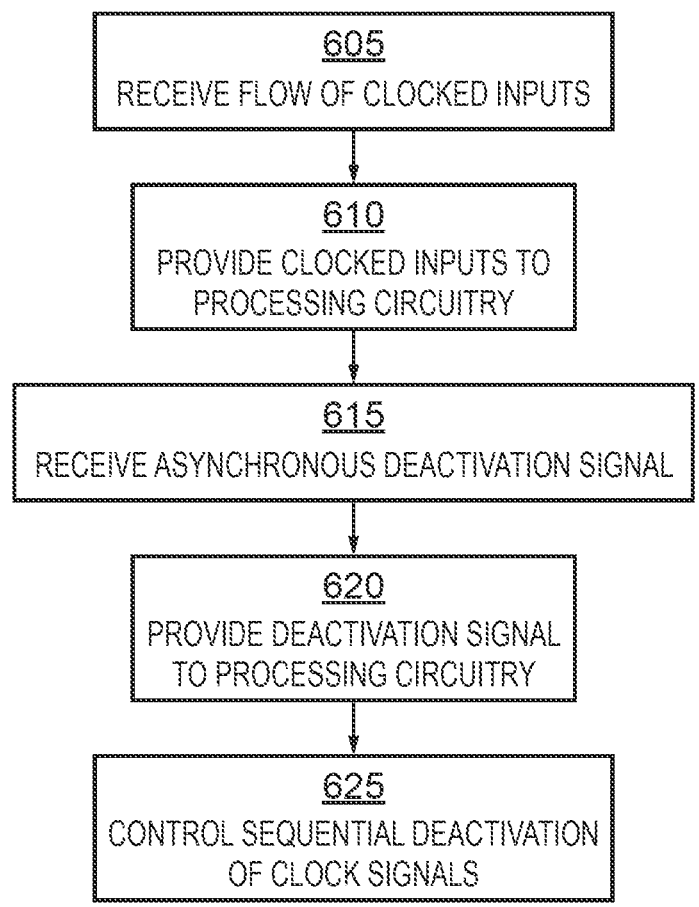
FIG. 6 depicts a method according to an example.

FIG. 6 depicts a method according to an example.

A flow of clocked inputs is received (605).

The received clocked inputs are provided to processing circuitry (610).

An asynchronous deactivation signal is received (615).

The deactivation signal is provided to the processing circuitry (620).

Clock signals, which mediate the clocked inputs, are sequentially deactivated (625).

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Figure 7:
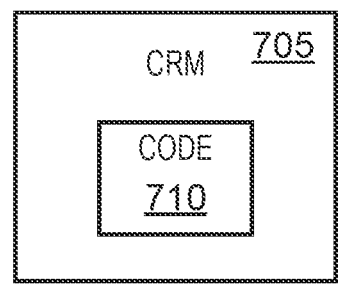
FIG. 7 depicts a computer-readable medium according to an example.

FIG. 7 shows an example of such a computer-readable medium 705, which comprises code 710 for fabrication of one or more of the apparatuses described herein.

Apparatuses and methods are thus provided for effective deactivation and reactivation of clock units which provide clock signals to processing circuitry.

From the above description it will be seen that the techniques described herein provides a number of significant benefits. In particular, system stability is maintained, such that received inputs can be processed without failing to proceed through the processing circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

Examples of the present disclosure are set out in the following numbered clauses:

1. An apparatus comprising:
    processing circuitry to process inputs, the processing circuitry comprising a plurality of sequential stages;
    clocked input circuitry to receive a flow of clocked inputs and provide said clocked inputs to the processing circuitry, said clocked inputs being synchronised with one or more clock signal of the processing circuitry; and
    asynchronous input circuitry to receive an asynchronous input and provide said asynchronous input to the processing circuitry, said asynchronous input being a deactivation signal to direct the processing circuitry to cease processing clocked inputs;
    clock circuitry to provide said one or more clock signals, said clock circuitry being responsive to said deactivation signal to control a deactivation of the one or more clock signals such that each of said plurality of sequential stages undergoes a respective corresponding number of clock cycles.

2. An apparatus according to clause 1, wherein the clock circuitry is configured to control the deactivation of the one or more clock signals such that:
    a clocked input received prior to the deactivation signal continues to proceed through the plurality of sequential stages; and
    a clocked input received subsequent to the deactivation signal is blocked from proceeding through the plurality of sequential stages.

3. An apparatus according to clause 1 or clause 2, wherein:
    the clock circuitry comprises a plurality of clock units, each clock unit being configured to generate a corresponding clock signal, each of the corresponding clock signals being one of said one or more clock signals;
    each said corresponding clock signal is associated with one of said plurality of sequential stages, such that the operations performed by a given sequential stage are mediated by its corresponding clock signal; and
    the clock circuitry is configured to control the deactivation by sequentially deactivating each of the plurality of clock units.

4. An apparatus according to clause 3, wherein the clock circuitry is configured to control the deactivation by deactivating one of said plurality of clock units in each of a plurality of subsequent clock cycles.

5. An apparatus according to any preceding clause, wherein said respective corresponding numbers of clock cycles are such that each of said plurality of sequential stages is deactivated at the same relative point in the flow of clocked signals.

6. An apparatus according to any preceding clause, wherein the clock circuitry is configured to receive said asynchronous input by monitoring the asynchronous input circuitry.

7. An apparatus according to any preceding clause, wherein the asynchronous input circuitry is responsive to the deactivation signal to temporarily block subsequent inputs that would change a power state of the processing circuitry.

8. An apparatus according to clause 7, wherein the asynchronous input circuitry is configured to perform said blocking by masking said subsequent inputs.

9. An apparatus according to clause 7 or clause 8, wherein the asynchronous input circuitry is configured to perform said temporary blocking whilst the clock circuitry is performing the deactivation of the one or more clock signals.

10. An apparatus according to any of clauses 7 to 9, wherein:
the clock circuitry is configured to issue a clock deactivation confirmation following completion of the deactivation of the one or more clock signals; and
the asynchronous input circuitry is configured to cease said blocking responsive to the clock deactivation confirmation.

11. An apparatus according to any preceding clause, wherein:
the asynchronous input circuitry is configured to, subsequent to said deactivation of the one or more clock signals, receive a second asynchronous input, the second asynchronous input being a reactivation signal to direct the processing circuitry to resume processing of clocked inputs; and
the clock circuitry is responsive to the reactivation signal to control a reactivation of the one or more clock signals such that each of said plurality of sequential stages undergoes a respective corresponding second number of clock cycles.

12. An apparatus according to clause 11, wherein the clock circuitry is configured to control the reactivation by sequentially reactivating the one or more clock signals in an order in which the clock signals were previously deactivated.

13. An apparatus according to clause 11 or clause 12, wherein the respective corresponding second numbers of clock cycles are such that each of said plurality of sequential stages is reactivated at the same relative point in the flow of clocked signals.

14. An apparatus according to any of clauses 11 to 13, wherein the reactivation signal is at least one of:
a wake signal;
a power-on signal; and
an activation signal.

14. An apparatus according to any preceding clause, wherein the deactivation signal is at least one of:
a sleep signal;
a power-down signal; and
a reset signal.

15. A method comprising:
receiving a flow of clocked inputs and provide said clocked inputs to processing circuitry comprising a plurality of sequential stages, each stage having an associated clock signal, said clocked inputs being synchronised with one or more of said clock signals; and
receiving an asynchronous input and providing said asynchronous input to the processing circuitry, said asynchronous input being a deactivation signal to direct the processing circuitry to cease processing clocked inputs;
responsive to said deactivation signal, controlling a deactivation of said one or more clock signals such that each of said plurality of sequential stages undergoes a respective corresponding number of clock cycles.

16. A non-transitory computer-readable medium to store computer-readable code for fabrication of the apparatus of any of clauses 1 to 14.

We claim:

1. An apparatus comprising:
processing circuitry configured to process inputs, the processing circuitry comprising a plurality of sequential stages;
clocked input circuitry configured to receive a flow of clocked inputs and provide said clocked inputs to the processing circuitry, said clocked inputs being synchronized with one or more clock signals of the processing circuitry, wherein said clocked inputs are configured to progress sequentially through the plurality of sequential stages; and
asynchronous input circuitry configured to receive an asynchronous input and provide said asynchronous input to the processing circuitry, said asynchronous input being a deactivation signal to direct the processing circuitry to cease processing clocked inputs;
clock circuitry configured to provide said one or more clock signals, said clock circuitry being responsive to said deactivation signal to control a deactivation of the one or more clock signals such that a given sequential stage of said plurality of sequential stages undergoes a number of clock cycles corresponding to a respective sequential position of said given sequential stage in the sequential progression of said clocked inputs through the plurality of sequential stages,
wherein the asynchronous input circuitry is responsive to the deactivation signal to temporarily block, while the clock circuitry is performing the deactivation of the one or more clock signals, subsequent inputs that would change a power state of the processing circuitry.

2. An apparatus according to claim 1, wherein the clock circuitry is configured to control the deactivation of the one or more clock signals such that:
a clocked input received prior to the deactivation signal continues to proceed through the plurality of sequential stages; and
a clocked input received subsequent to the deactivation signal is blocked from proceeding through the plurality of sequential stages.

3. An apparatus according to claim 1, wherein:
the clock circuitry comprises a plurality of clock units, each clock unit being configured to generate a corresponding clock signal, each of the corresponding clock signals being one of said one or more clock signals;
each said corresponding clock signal is associated with one of said plurality of sequential stages, such that the operations performed by said given sequential stage are mediated by its corresponding clock signal; and
the clock circuitry is configured to control the deactivation by sequentially deactivating each of the plurality of clock units.

4. An apparatus according to claim 3, wherein the clock circuitry is configured to control the deactivation by deactivating one of said plurality of clock units in each of a plurality of subsequent clock cycles.

5. An apparatus according to claim 1, wherein said numbers of clock cycles are such that each of said plurality of sequential stages is deactivated at the same relative point in the flow of clocked signals.

6. An apparatus according to claim 1, wherein the clock circuitry is configured to receive said asynchronous input by monitoring the asynchronous input circuitry.

7. An apparatus according to claim 1, wherein the deactivation signal is at least one of:
   a sleep signal;
   a power-down signal; and
   a reset signal.

8. An apparatus according to claim 1, wherein the asynchronous input circuitry is configured to perform said blocking by masking said subsequent inputs.

9. An apparatus according to claim 1, wherein:
   the asynchronous input circuitry is configured to, subsequent to said deactivation of the one or more clock signals, receive a second asynchronous input, the second asynchronous input being a reactivation signal to direct the processing circuitry to resume processing of clocked inputs; and
   the clock circuitry is responsive to the reactivation signal to control a reactivation of the one or more clock signals such that each of said plurality of sequential stages undergoes a respective corresponding second number of clock cycles.

10. An apparatus according to claim 9, wherein the respective corresponding second numbers of clock cycles are such that each of said plurality of sequential stages is reactivated at the same relative point in the flow of clocked signals.

11. An apparatus according to claim 9, wherein the reactivation signal is at least one of:
    a wake signal;
    a power-on signal; and
    an activation signal.

12. An apparatus according to claim 9, wherein the clock circuitry is configured to control the reactivation by sequentially reactivating the one or more clock signals in an order in which the clock signals were previously deactivated.

13. An apparatus comprising:
    processing circuitry configured to process inputs, the processing circuitry comprising a plurality of sequential stages;
    clocked input circuitry configured to receive a flow of clocked inputs and provide said clocked inputs to the processing circuitry, said clocked inputs being synchronized with one or more clock signals of the processing circuitry, wherein said clocked inputs are configured to progress sequentially through the plurality of sequential stages; and
    asynchronous input circuitry configured to receive an asynchronous input and provide said asynchronous input to the processing circuitry, said asynchronous input being a deactivation signal to direct the processing circuitry to cease processing clocked inputs;
    clock circuitry configured to provide said one or more clock signals, said clock circuitry being responsive to said deactivation signal to control a deactivation of the one or more clock signals such that a given sequential stage of said plurality of sequential stages undergoes a number of clock cycles corresponding to a respective sequential position of said given sequential stage in the sequential progression of said clocked inputs through the plurality of sequential stages, wherein
    the asynchronous input circuitry is responsive to the deactivation signal to temporarily block subsequent inputs that would change a power state of the processing circuitry, wherein:
    the clock circuitry is configured to issue a clock deactivation confirmation following completion of the deactivation of the one or more clock signals; and
    the asynchronous input circuitry is configured to cease said blocking responsive to the clock deactivation confirmation.

14. A method comprising:
    receiving a flow of clocked inputs and providing said clocked inputs to processing circuitry comprising a plurality of sequential stages, each stage having an associated clock signal, said clocked inputs being synchronized with one or more of said clock signals, wherein said clocked inputs are configured to progress sequentially through the plurality of sequential stages; and
    receiving an asynchronous input and providing said asynchronous input to the processing circuitry, said asynchronous input being a deactivation signal to direct the processing circuitry to cease processing clocked inputs;
    responsive to said deactivation signal, controlling a deactivation of said one or more clock signals such that a given sequential stage of said plurality of sequential stages undergoes a number of clock cycles corresponding to a respective sequential position of said given sequential stage in the sequential progression of said clocked inputs through the plurality of sequential stages,
    responsive to said deactivation signal, temporarily blocking, while performing the deactivation of the one or more clock signals, subsequent inputs that would change a power state of the processing circuitry.

* * * * *